(12) United States Patent
Bali et al.

(10) Patent No.: US 7,787,383 B2
(45) Date of Patent: Aug. 31, 2010

(54) METHOD AND APPARATUS FOR MONITORING A CONNECTION IN A PEER-TO-PEER NETWORK

(75) Inventors: Naveen Bali, Cary, NC (US); Ravi K. Budhia, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1054 days.

(21) Appl. No.: 11/073,289

(22) Filed: Mar. 4, 2005

(65) Prior Publication Data

US 2006/0200551 A1    Sep. 7, 2006

(51) Int. Cl.
*G01R 31/08* (2006.01)
*H04L 1/00* (2006.01)
*G06F 9/00* (2006.01)

(52) U.S. Cl. .................. 370/241; 370/250; 370/252; 370/216; 709/107; 709/239; 709/250; 714/48; 714/21

(58) Field of Classification Search ........... 370/241, 370/242, 244, 250, 252, 216, 217, 248, 201; 713/201, 168; 714/48, 100, 21; 709/107, 709/239, 250

See application file for complete search history.

(56) References Cited

U.S. PATENT DOCUMENTS

| | | | | |
|---|---|---|---|---|
| 6,324,161 B1 * | 11/2001 | Kirch | ................... | 370/217 |
| 6,545,981 B1 * | 4/2003 | Garcia et al. | .............. | 370/242 |
| 6,697,960 B1 * | 2/2004 | Clark et al. | ................... | 714/15 |
| 2001/0054158 A1 * | 12/2001 | Jarosz | .................. | 713/201 |
| 2002/0129232 A1 * | 9/2002 | Coffey | ..................... | 713/1 |
| 2002/0141424 A1 | 10/2002 | Gasbarro | | |
| 2005/0007964 A1 | 1/2005 | Falco | | |

FOREIGN PATENT DOCUMENTS

EP    0902576    3/1999

OTHER PUBLICATIONS

Infiniband Trade Association; "Infiniband Architecture Specification vol. 1, Release 1.1"; Nov. 6, 2002;.

* cited by examiner

*Primary Examiner*—Aung S Moe
*Assistant Examiner*—Jamal Javaid
(74) *Attorney, Agent, or Firm*—Blakely, Sokoloff, Taylor & Zafman LLP

(57) ABSTRACT

The status of an appliance may be monitored using promiscuous packets and network reads. In order to establish a peer-to-peer connection between two appliances, a connection manager may issue a communication to a first appliance to establish a connection with a second, remote appliance. The connection manager issues a similar communication to the second appliance. The first appliance issues a promiscuous packet to the second appliance including connection information to establish a peer connection between the two appliances. The first appliance continues to issue the promiscuous packets even after the connection is established to indicate that the first appliance is still available. If the second appliance does not receive a promiscuous packet, the second appliance may attempt to perform a read over the connection. If the attempt to perform a read fails, the second appliance can notify the connection manager that the connection is no longer active.

17 Claims, 7 Drawing Sheets

METHOD AND APPARATUS FOR MONITORING A CONNECTION IN A PEER-TO-PEER NETWORK

FIELD OF THE INVENTION

The present invention generally relates to monitoring network status, and specifically to using promiscuous packets to monitor system condition.

BACKGROUND

A network appliance is a processing system that may be connected to a network to provide service to other devices over the network. A file server, or filer, is an example of a network appliance. A filer is a form of storage server which provides file storage and file access to remote clients that request access to the data storage. Another type of storage server, which may be implemented as an appliance, is one which provides clients with block-level access to stored data, rather than file-level access. Such a server can be used in a storage area network (SAN), for example, to provide an interface between clients and mass storage devices.

Data is stored by a filer in the form of volumes. A volume on a filer may be mirrored onto a volume on another filer. "Mirroring" refers to generating a copy (a "mirror") of a volume, often on another storage device at a remote location. The copy is a mirrored volume, and can be accessed if the original volume is unavailable for any reason. For example, a first filer may include a volume of data that has been generated by various network users. The volume on the first filer is mirrored onto a mirrored volume of a second filer. The second filer is at a remote location so that if the first filer experiences a service interruption, the second filer probably will not be affected by the cause of the interruption.

Mirroring may be achieved, in part, by writing data coming into the first filer into a memory on the first filer, as well as a memory on the second filer, before writing the data to permanent storage (e.g., a hard drive, optical drive, etc.) The data are stored in the memory until a time known as a consistency point (CP), when the data are written from the memory to the volume on disk.

Mirroring in this manner requires an active connection between the two filers. A link between the two filers is established over a network to facilitate the mirroring relationship. It is possible that the link may be severed without notice to the filers. For example, if the first filer experiences a service interruption, the link between the two filers is no longer active, and the second filer is not notified that the link is inactive. If the filers are unaware of a disruption in the link, the mirroring capability may be lost. What is needed, therefore, is a way to monitor the status of a link between appliances, such as filers, particularly a link used for mirroring data on two or more filers.

SUMMARY

The present invention includes methods and apparatuses for Monitoring a Connection in a Peer-to-Peer Network. In one method, a connection is established with a remote processing system. It is then determined whether the connection with the remote processing system is active by receiving a packet from the remote processing system at a regular interval. If the packet is not received, a data access is performed over the connection. If the data access fails, it is determined that the connection is not active.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for Monitoring a Connection in a Peer-to-Peer Network. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, the status of an appliance may be monitored using promiscuous packets and network reads. The term "promiscuous packet" will be further defined below. In order to establish a peer-to-peer connection between two appliances in a redundant network, a connection manager may issue a communication to a first appliance to establish a connection with a second, remote appliance. The first appliance issues a promiscuous packet to the second appliance including connection information to establish a peer connection between the two appliances (i.e., "peer connect"). The first appliance continues to issue the promiscuous packets over the connection after it is established. If the second appliance receives a promiscuous packet from the first appliance, the second appliance knows that the connection is active. If the second appliance does not receive a promiscuous packet, the second appliance may attempt to perform a read over the connection. If the attempt to perform a read fails, the second appliance can notify the connection manager that the connection is no longer active. The sending of the promiscuous packets may also provide a heartbeat (a signal that an appliance is continuously operating) for the sending appliance.

Figure 1:
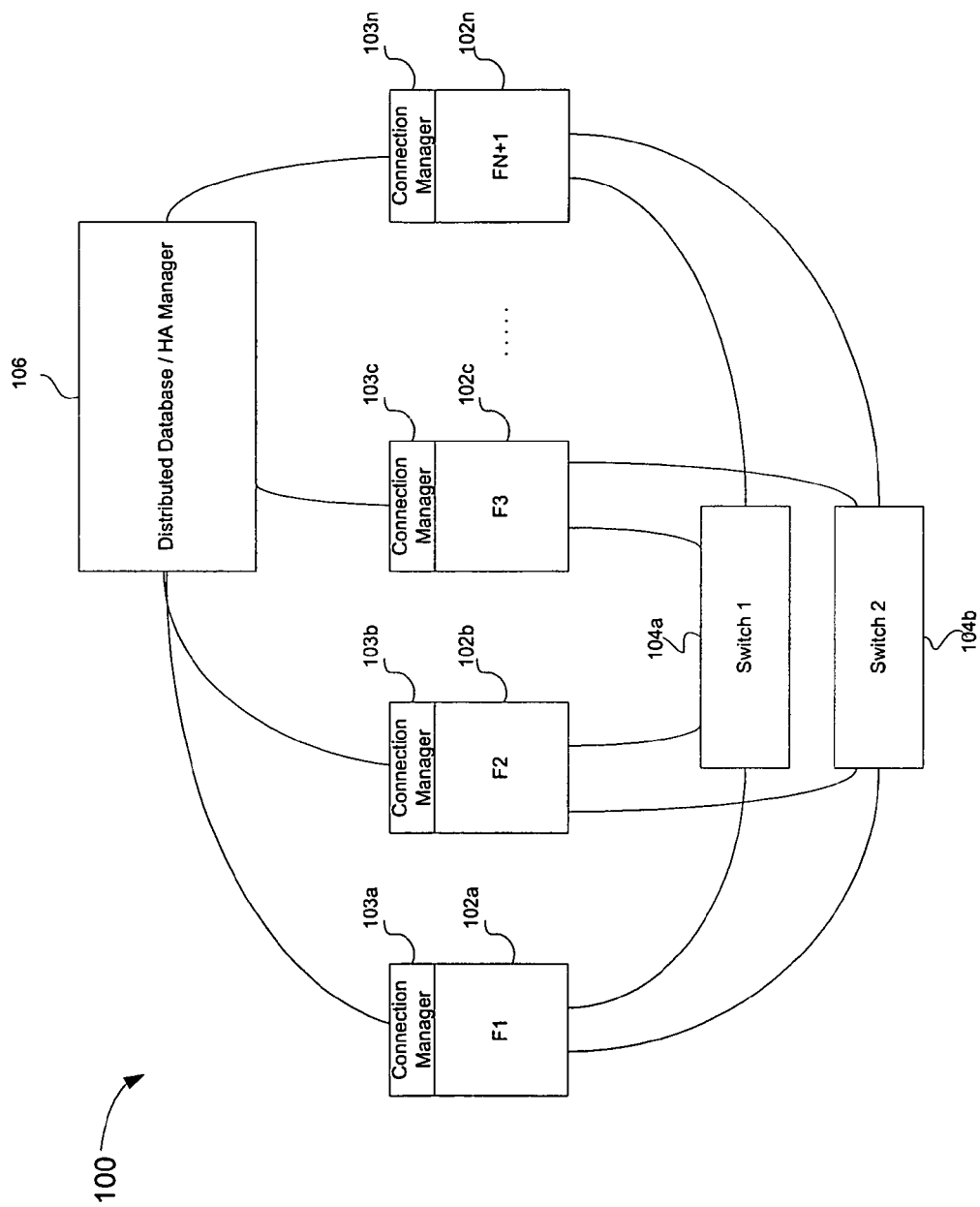
FIG. 1 illustrates several filers connected using a peer-to-peer network.

FIG. 1 illustrates several filers connected using a peer-to-peer network 100. A peer-to-peer network 100, as opposed to a client-server network, allows each filer (each "peer") on the network to connect directly with each other filer. According to one embodiment of the invention, a peer-to-peer network 100 improves reliability, since the failure of any one component of the network 100 reduces the number of affected systems compared to the failure of a server in a client-server network. Since each connection is established between individual filers, if one filer becomes disabled, only the connections to that appliance are affected.

The network 100 includes several filers 102. Although filers are described here, it is understood that any other type of appliance or processing system may be used in the network 100. Each filer 102 includes a connection manager 103 that determine when connections need to be established and initiates the connections. The connection manager 103 is a software stack within each filer 102. The connection managers 103 may be stored in memory during the filers' 102 operation. The connection managers 103 may be controlled or managed by operating systems of the filers 102. The filers 102 may initiate peer connections between each other through the switches 104. Each of the filers 102 includes a non-volatile random access memory (NVRAM) card which includes two interconnect ports (not shown in FIG. 1). According to an alternate embodiment of the invention, the interconnect ports are located on a separate interconnect card. One interconnect port is connected to the first switch 104a, and the other interconnect port is connected to the second switch 104b. By having redundant connections and two switches 104, if one of the ports, switches 104, or links fails, the network 100 may continue operating.

A distributed database/high availability (HA) manager 106 communicates with each of the filers 102. The HA manager 106 communicates with the connection managers 103 using kernel-level interprocess communication. The HA manager 106 stores and may include a distributed database that includes addresses and identification of the filers 102. For example, each filer 102 may be assigned a local identifier (LID) based on the serial number of its NVRAM card. The distributed database stores the LIDs from each filer 102 on the network 100, as well as other configuration information. If, for example, the filer 102a needs the LID of the filer 102b, the filer 102a can request the LID of the filer 102b from the HA manager 106. The HA manager can also determine what course to take in the event of a downed connection. In one embodiment, instead of a distributed database, there is a central connection manager, which may be stored on one of the filers 102.

The connection manager 103 may also determine when a connection to another filer 102 needs to be established. The connection manager 103 can then direct each of the two appliances 102 to issue promiscuous packets including connection information such that a connection may be established. This will be explained in greater detail below.

The network 100 may allow mirroring of data between two filers 102. Mirroring may be achieved, in part, by writing data coming into a first filer (e.g., the filer 102a) into a memory before writing the data to permanent storage (e.g., a hard drive, optical drive, etc.) This memory may be known as a non-volatile random access memory (NVRAM), which will retain its contents even when power is removed. The NVRAM may be a flash memory, battery-powered memory, magnetic storage, etc. The data is stored in the NVRAM until a time known as a consistency point (CP), when the data is written from the memory to the volume on disk. If a filer experiences a failure before a CP, the data in the NVRAM will need to be accessed to retrieve all of the data written to the filer. Mirroring may be achieved by writing the incoming data to a NVRAM on a second filer (e.g., the filer 102a) when the data is written to an NVRAM of the first filer. The second filer then has the same NVRAM contents as the first filer.

According to one embodiment of the invention, the network 100 is an Infiniband network, and certain components and features of the Infiniband network may be described herein. Further, the interconnect card or NVRAM card may include Infiniband ports. However, it is understood that embodiments of the invention may also be practiced using other network types, including Fibre Channel, transmission control protocol/Internet protocol (TCP/IP), etc.

Figure 2:
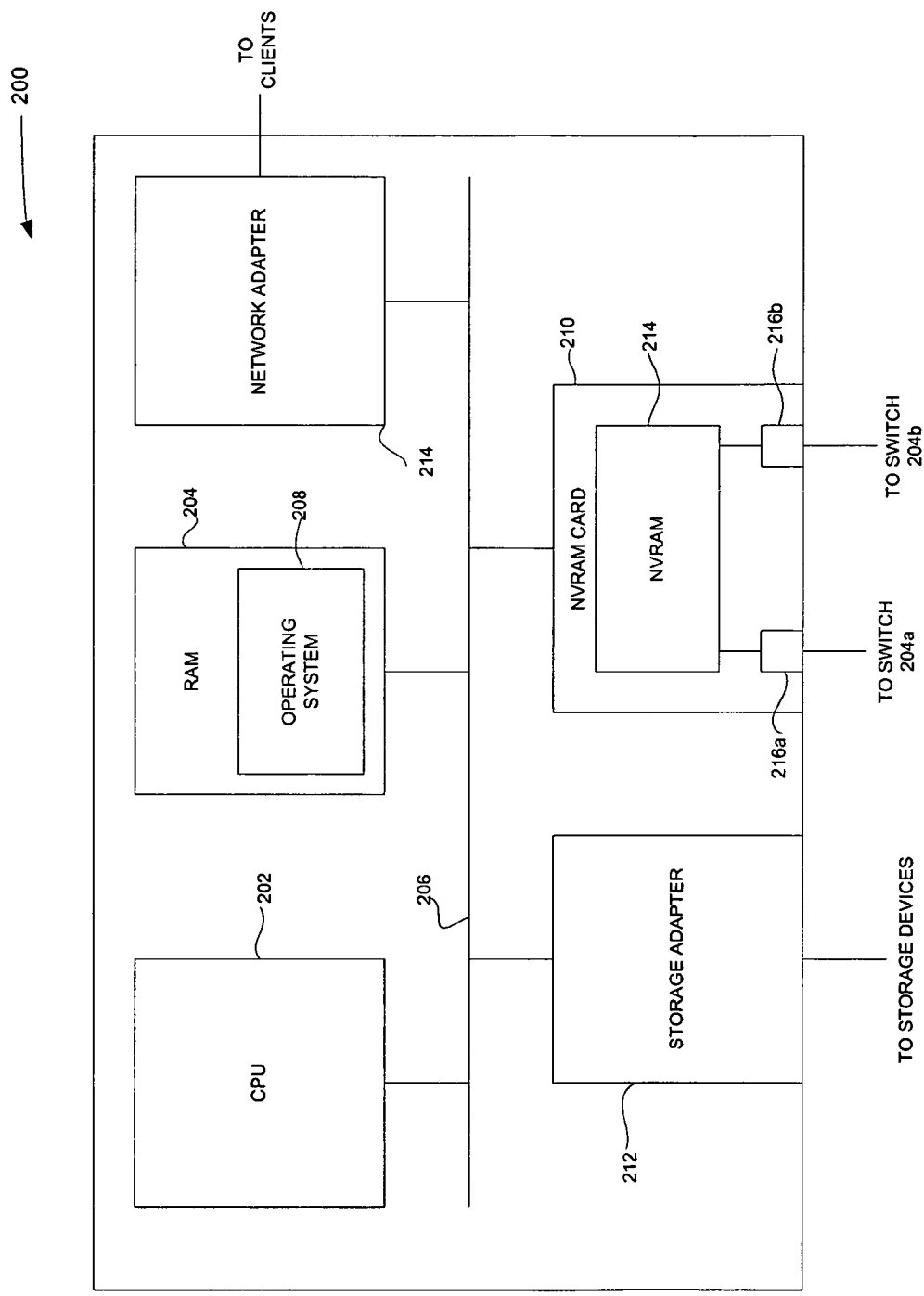
FIG. 2 shows the architecture of a filer according to certain embodiments of the invention.

FIG. 2 shows the architecture of a filer 200, representative one of the filers 102, according to certain embodiments of the invention. A filer is a type of storage server used to store file data. Note that certain standard and well-known components which are not germane to the present invention are not shown. The filer 200 includes a processor 202 and main memory 204, coupled together by a bus system 206. The bus system 206 in FIG. 2 is an abstraction that represents any one or more separate physical buses and/or point-to-point connections, connected by appropriate bridges, adapters and/or controllers. The bus system 206, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 202 is the central processing unit (CPU) of the filer 200 and, thus, controls the overall operation of the filer 200. In certain embodiments, the processor 202 accomplishes this by executing software stored in main memory 204. The processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 204, which is generally some form of random access memory (RAM), stores at least a portion of the operating system 208 of the filer 200. Techniques of the present invention may be implemented within the operating system 208, as described further below. The operating system 208 may be, for example, the ONTAP operating system by NetApp®. Also connected to the processor 202 through the bus system 206 are an NVRAM card 210, a storage adapter 212, and a network adapter 214. The storage adapter 212 allows the filer 200 to access the external mass storage devices and may be, for example, a Fibre Channel (FC) adapter or SCSI adapter. The network adapter 214 may include an Infiniband, FC, Ethernet, or other adapter, and may provide a connection allowing remote clients to communicate with the filer 200.

The NVRAM card 210 includes an NVRAM 216, which may be a flash memory, magnetic memory, battery-powered memory, etc. The NVRAM card 210 also includes two interconnect ports 218. The first interconnect port 218a is connected to the first switch 104a, and the second interconnect port 218b is connected to the second switch 104b. As mentioned above, having two interconnect ports creates redundancy which allows the network connections to continue functioning even if one of the switches 104 becomes disabled. The interconnect ports 218 may conform to the specifications of an Infiniband, Fibre Channel, Ethernet, etc. network. When a consistency point (CP) occurs, the contents of the NVRAM 216 are transferred to the mass storage devices through the storage adapter 212.

Figure 3:
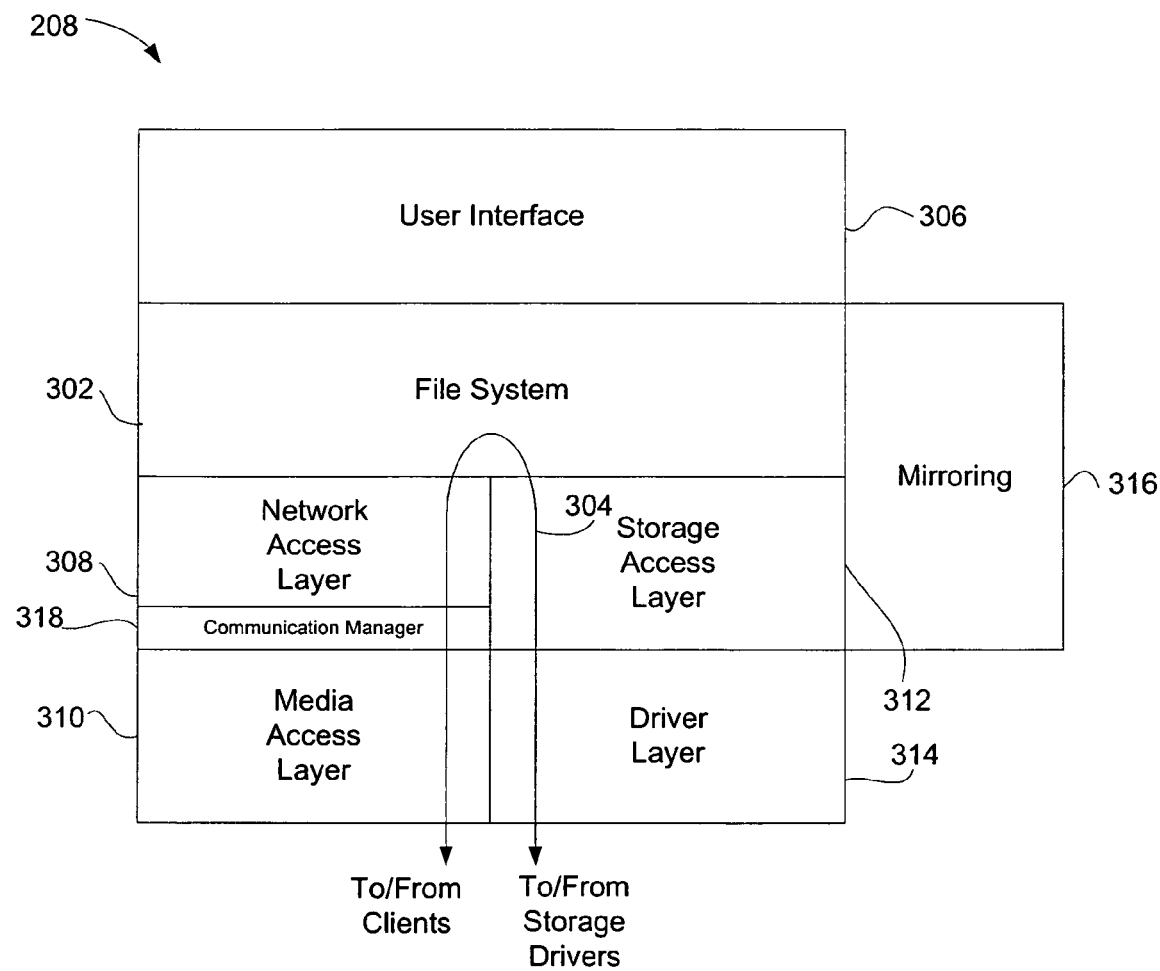
FIG. 3 illustrates the operating system 208 of the filer 200, according to certain embodiments of the invention.

FIG. 3 illustrates the operating system 208 of the filer 200, according to certain embodiments of the invention. As can be seen, the operating system 208 includes a number of layers. The core of the operating system 208 is the file system 302. The file system 302 is a programmatic entity that imposes structure on an address space of one or more physical or virtual storage devices, such as disks, so that the operating system 208 may conveniently read and write data containers, such as files and blocks, and related metadata. The file system 302, among other responsibilities, executes read and write operations on the mass storage devices in response to client requests, maintains directories, and manages consistency point operations. An example of the file system 302 suitable for this purpose is the Write Anywhere File Layout to (WAFL) file system from Network Appliance, such as used in the NetApp® Filers. Also shown in FIG. 3 is the logical data path 304 from clients to mass storage devices, through the file system 302.

The operating system 208 also includes a user interface 306, through which a network administrator or other user can control and/or configure the filer 200 of FIG. 2 (e.g., remotely from a management station). The user interface 306 may generate a command line interface and/or a graphical user interface for this purpose.

The client side of the operating system 208 includes a network access layer 308 and, at the lowest level, a media access layer 310. The network access layer 308 implements any of various protocols used to communicate with client devices, such as network file system (NFS), common Internet file system (CIFS) and/or hypertext transport protocol (HTTP). The media access layer 310 includes one or more drivers which implement the protocols used to communicate over the network, such as Ethernet.

On the storage device side, the operating system 208 includes a storage access layer 312 and, at the lowest level, a driver layer 314. The storage access layer 312 implements a disk storage protocol such as RAID, while the driver layer 314 implements a lower-level storage device access protocol, such as Fibre Channel or SCSI.

The operating system of 208 also includes a mirroring module 316, which is operatively coupled to the file system 302 and the storage access layer 312. The mirroring module 316 controls the synchronization of data at the remote secondary site with data stored at the primary site. The techniques introduced herein may be implemented at least partially using the mirroring module 316. The operating system 208 further includes a connection manager 318, similar to the connection manager 103 described above. The connection manager 318 initiates and manages peer-to-peer connections with other filers.

Figure 4:
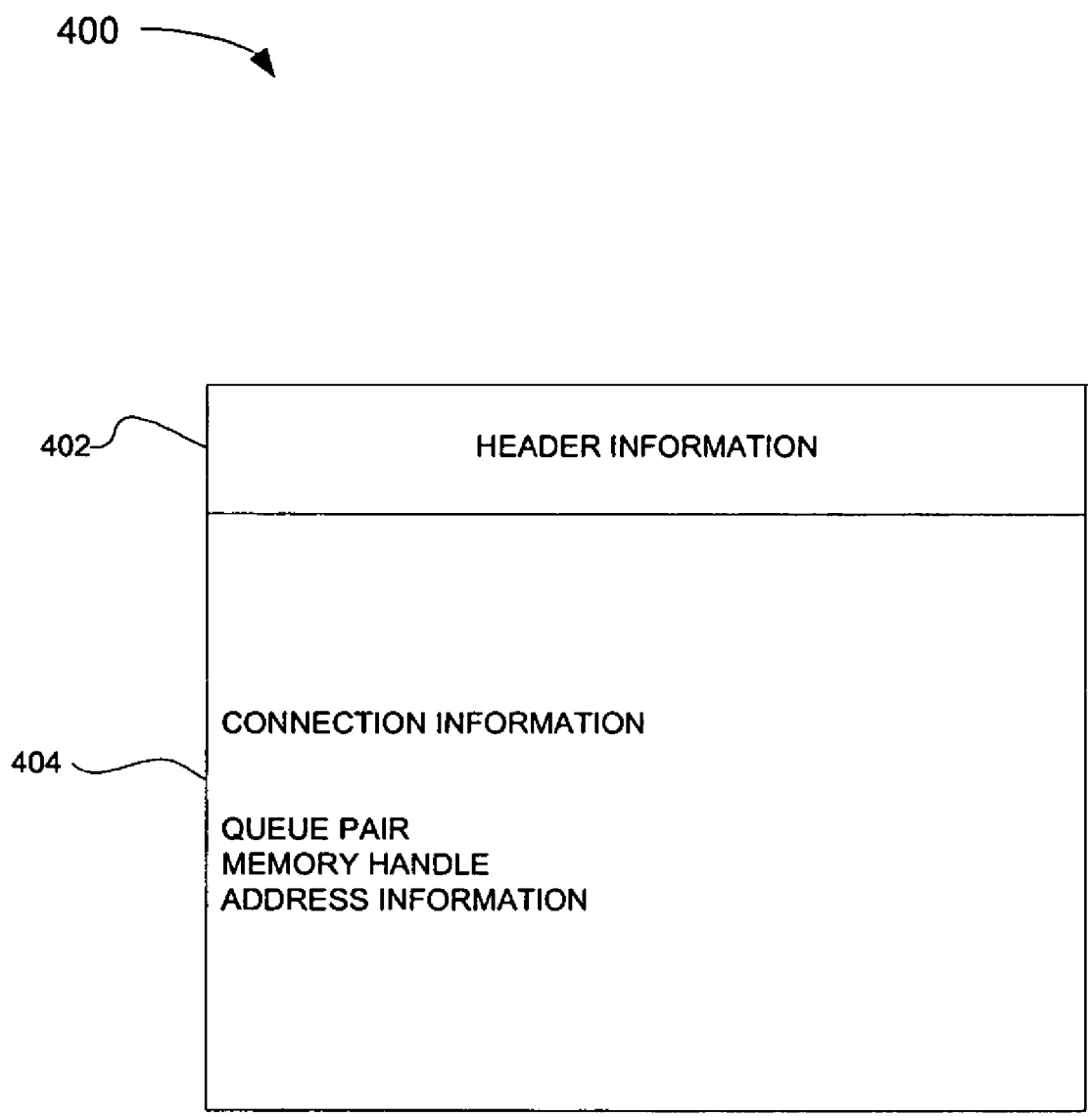
FIG. 4 illustrates a promiscuous packet used to establish a peer connection between two filers.

FIG. 4 illustrates a promiscuous packet used to establish a peer connection between two filers. A "packet" is a unit of data routed between a source and a destination. For example, a packet may be a four-kilobyte unit of data sent from a first filer to a second filer. The packet includes certain destination information to provide the network with the necessary information for routing the packet. A promiscuous packet is a packet that may be sent to a recipient without being requested. For example, a promiscuous packet may be sent by a first filer to a second filer, and the second filer would be unaware of the promiscuous packet's existence until the second filer receives the packet.

A promiscuous packet can be sent to a filer (or other node on a network) without using an established connection. For example, a promiscuous packet can be sent from a first filer to a second, remote filer's LID through the network 100. Even if there is no active connection between the two appliances, the data packet will arrive at the remote appliance. A promiscuous packet is a feature found in several network types, including Infiniband, Fibre Channel, etc. For example, a node on an Infiniband network may issue a management datagram (MAD) over the network to any LID. Infiniband includes a protocol to connect between devices. If no connection between the devices is active, one device may contact another device using the MAD.

According to one embodiment, a promiscuous packet 400 has a predetermined format and a fixed packet size. For example, an Infiniband (IB) MAD must include certain header information 402, and must be of a fixed size to reach its destination. The header information 402 in an IB MAD typically includes information such as the local identifier (LID) of the recipient filer, the operation to be performed at the destination, etc. If the correct header information 402 is included, and the packet otherwise meets the specifications of the network, other data may be included in the promiscuous packet 400 This provides an efficient way to send useful information from a source to a destination, without having much a-priori information about the destination. According to an embodiment of the invention, connection information 404 may be added to the promiscuous packet 400 such that the receiving filer can use the connection information 404 to establish a connection with the sending filer.

According to one embodiment, the connection information 404 includes a queue pair (QP) number, memory handle, and address information. A queue pair is a pair of queues, a send and a receive queue, on the filer sending the packet 400. A queue is a port through which data may either be sent or received. The QP in the connection information 404 is an available queue on the sending filer. For example, a first filer, trying to establish a connection with a second filer, may indicate that QP14 is available for communication. The second filer will send a similar packet to the first filer. When a filer has received the connection information 402 from the other filer, the filer begins establishing the connection. The second filer, after receiving the promiscuous packet 400, determines an available QP on the second filer, and a connection is made between the two. On IB networks, QP0 and QP1 are the reserved "special" QPs to which the promiscuous packets may be sent. A special QP is a QP that is reserved for the receipt and transmission of promiscuous packets. Instead of QPs, other networks or protocols may use other constructs, such as ports or sockets, which are well defined in those networks and protocols.

A memory handle is a unique identifier used to represent a memory region. The memory handle often points to an entry in a table that maps between virtual and physical memory addresses. To perform a read or write on a local system, a remote appliance needs the physical address in the memory, however the operating system of the appliance may report virtual memory addresses, which may not be accessible without the corresponding physical address. The memory handle allows a memory requester, such as a remote filer, to determine the physical address of a parcel of memory using a virtual memory address. The address information is the virtual address information passed by the requesting appliance. The address information may reflect the address of the available NVRAM on the first filer, and can be translated using the memory handle.

The connection manager 103 determines that a connection should be established between a first and a second filer. The connection manager 103 then instructs the first and second filers to each issue a promiscuous packet 400 containing connection information 404, as described above, to the other filer. Each filer then receives the promiscuous packet 400 and the connection information 404 from the other filer, and establishes the connection using the connection information 404.

It is understood that additional or alternative connection information 404 may be included in the promiscuous packet 400. It is further understood that the promiscuous packet 400 may also include information unrelated to the connection between two filers. For example, a filer may continue to issue promiscuous packets over a connection after it is established. These packets may include data that can be used to synchronize the mirroring, or other connection data. Further, as will be described below, these further packets are used to monitor the status of the connection established using the promiscuous packet 400.

Figure 5:
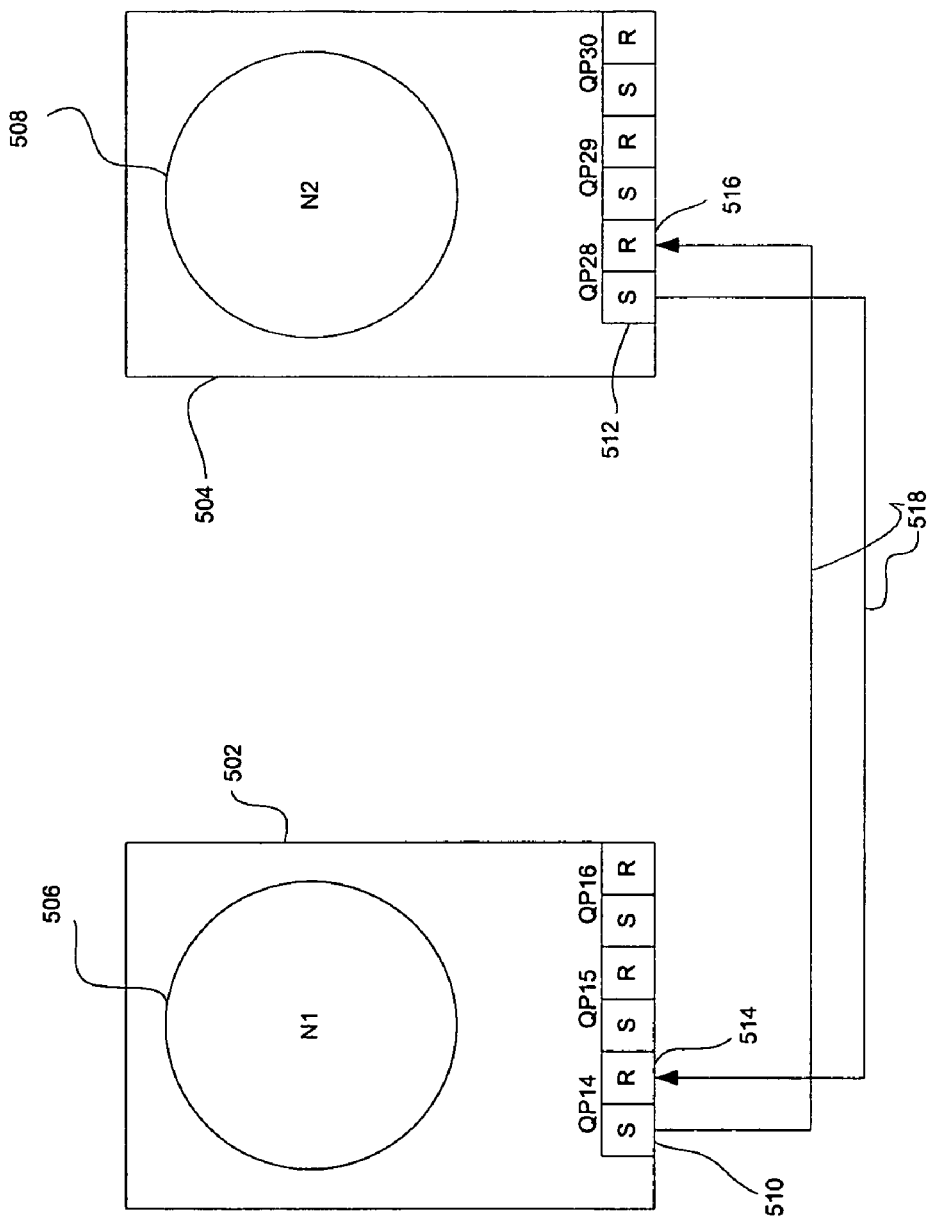
FIG. 5 illustrates sending and receiving data using queue pairs (QPs) on NVRAM cards.

FIG. 5 illustrates sending and receiving data using queue pairs on NVRAM cards. Two filers, for example filers 102*a* and 102*b*, each have an NVRAM card, 502 and 504, respectively. The NVRAM cards 502 and 504 each include an NVRAM 506 and 508, and a send queue 510 and 512, and a receive queue 514 and 516. A queue pair (QP) refers to a send-receive pair on a device. For example, the send queue 510 and receive queue 514 on the NVRAM card 502 comprise a general-purpose queue pair, here identified as QP 14. The send and receive queues 512 and 516 comprise the queue pair QP28 on the NVRAM card 504. As is shown in FIG. 5, each NVRAM card 502 and 504 may include several other QPs. As mentioned above, each NVRAM card 502 and 504 may include two ports, each having several QPs. The QPs of a single port on the NVRAM cards 502 and 504 are shown here for simplicity. It is further understood that although NVRAM cards 502 and 504 are shown and discussed herein, that other communications cards, such as cluster interconnect cards may be used.

When a promiscuous packet 400 with connection information 404 is issued to a filer (for example, when the appliance having the NVRAM card 504 issues a packet 400 to the appliance having the NVRAM card 502), the receiving filer may establish a connection with the QP indicated in the packet 400. In this example, the receiving NVRAM card 502 would establish a connection with the indicated QP in the connection information 404 with an available QP on the NVRAM card 502. The two NVRAM cards 502 and 504 may send and receive data to and from each other over the connection 518. The data transfers may be performed using remote direct memory access (RDMA) reads and writes and can serve as a "heartbeat" (a status signal) between the two filers.

Information other than initial connection information 404 may also be sent using the promiscuous packet 400. Even after a connection is established, the filers comprising the connection may continue to issue promiscuous packets to each other through the special QPs QP0 and QP1. These packets can be used to determine whether the connection is still active. These packets can also serve as a heartbeat, indicating that the sending filer is still active.

For example, if a first filer is no longer receiving promiscuous packets from a second filer to which a connection 518 is established, the first filer may be prompted to investigate the status of the connection. The second filer may be busy and unable to send an expected promiscuous packet, but the connection may still be active. The first filer may then, according to one embodiment, attempt to perform a RDMA read of the NVRAM (or other memory) of the second filer. RDMA reads are performed over the established connection 518. If the RDMA read fails, the connection has failed, and the HA manager 106 may be notified. The HA manager 106 may then take appropriate corrective action to repair the connection.

The HA manager 106 may decide to begin failover procedures to replace the affected appliance with a mirrored appliance, for example. The HA manager 106 may also determine that the non-responsive filer is still functioning, and that the connection has failed. In that case, the HA manager 106 may instruct the two filers to re-establish the connection.

Failover typically comprises substituting the failed filer with the filer that was mirroring the failed filer. In this way, data access requests to the failed filer may be transparently made to the mirroring filer. The failed filer may then be diagnosed and repaired using known techniques and eventually returned to service. The HA manager 106 may also attempt to contact the failed filer before ordering failover.

Figure 6:
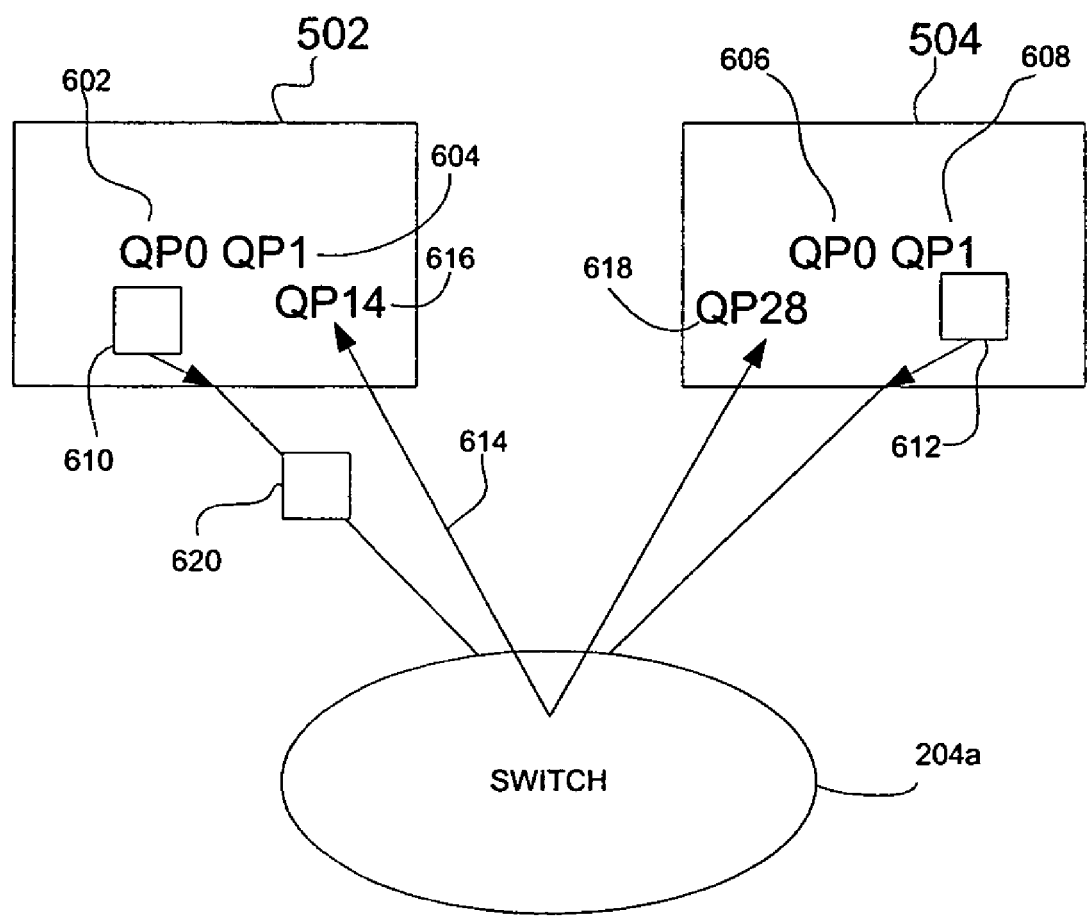
FIG. 6 illustrates using special QPs to send promiscuous packets.

FIG. 6 illustrates using special QPs to send promiscuous packets. Each port on a network (here, the interconnect portions of the NVRAM cards 502 and 504) has two special QPs, QP0 and QP1. The special QPs of one of the ports of the NVRAM card 502 are QP0 602 and QP1 604, and the special QPs of one of the ports of the NVRAM card 504 are QP0 606 and QP1 608. The promiscuous packet 400 may be sent from one of the special QPs on one NVRAM card to the corresponding special QP on the other NVRAM card.

For example, the connection manager 103 may instruct the NVRAM card 502 to issue a promiscuous packet 610 to the NVRAM card 504. The NVRAM card 502 may place the packet 610 in the send queue of the QP0 602. The packet may then be transferred over the network 100 to the switch 104*a*. The switch 104*a* determines the LID of the destination NVRAM card 504 by examining the header information in the packet 610. The switch then directs the packet 610 to the receive queue of the special QP QP0 606 on the NVRAM card 604.

The connection manager 103 may also instruct the NVRAM card 504 to issue a reciprocal promiscuous packet 612. The reciprocal promiscuous packet 612 is similar to the promiscuous packet 610, and includes the same connection information, although the connection information is from the perspective of the NVRAM card 504. In this example, a connection 614 is established between QP14 616 of the NVRAM card 502 and QP28 618 of the NVRAM card 504. The connection manager 103 may further instruct the NVRAM cards 502 and 504 to continue issuing promiscuous packets 620 even after the connection 614 is established between the NVRAM cards 502 and 504. The packets 620 are sent from the special QPs of one NVRAM card 502 or 504 to the corresponding special QPs of the other NVRAM card 502 or 504, as described above, and may include NVRAM mirroring data, data to synchronize the time daemons on both NVRAM cards 502 and 504, etc. These packets may be used to monitor the status of the connection 614.

Figure 7:
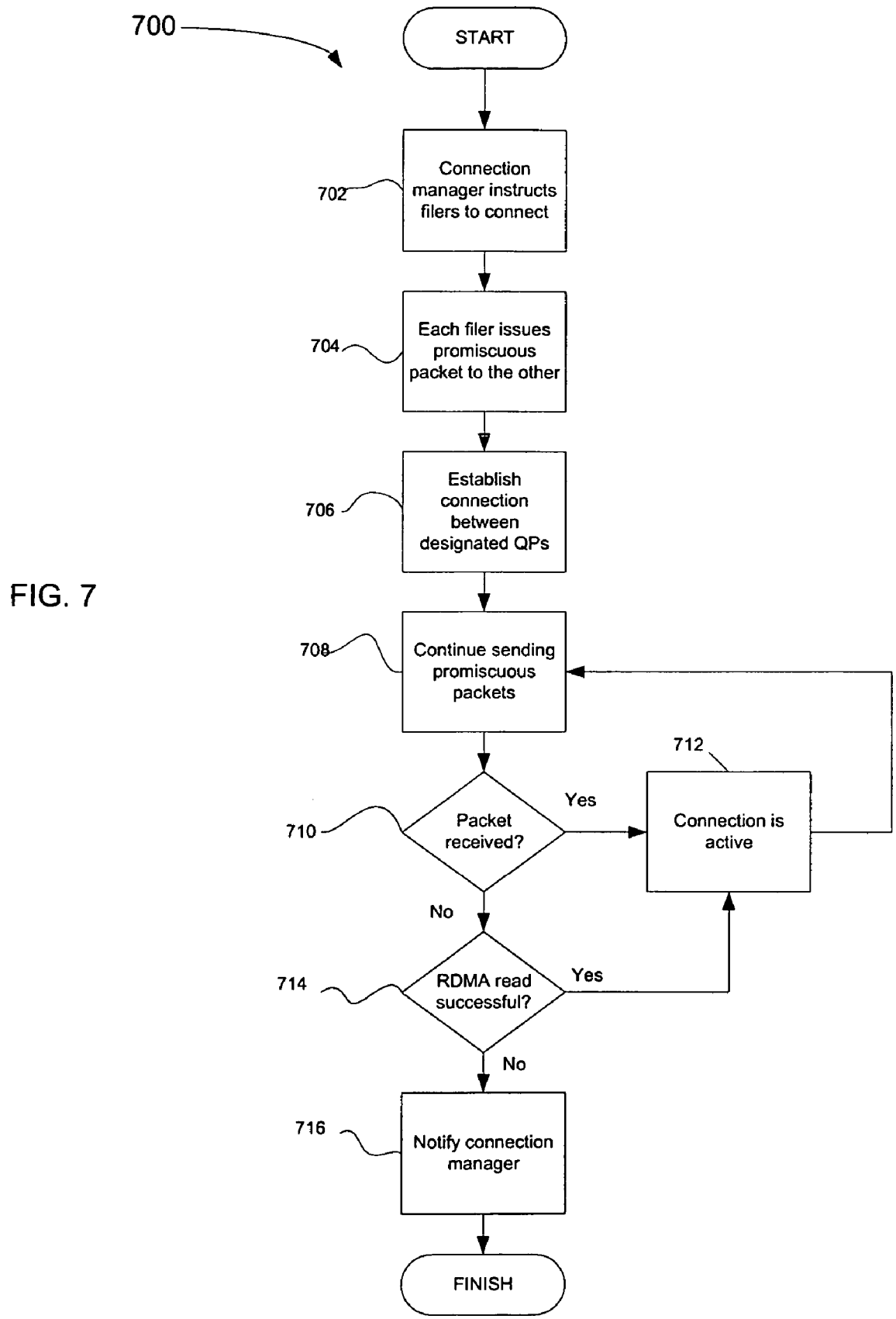
FIG. 7 is a flowchart describing a process for monitoring the status of a connection between two processing systems, such as two filers.

FIG. 7 is a flowchart describing a process for monitoring the status of a connection between two processing systems, such as two filers. In block 702, the connection manager 103 instructs two processing systems to connect to each other. In this example, the two processing systems are two filers 102. In a peer-to-peer network, such as the network 100, the network comprises connections between individual systems. The distributed database stores the LIDs of the filers 102, and can initiate these peer-to-peer connections to establish the network 100.

In block 704, each appliance instructed to establish a connection issues a promiscuous packet 400 to the other. The promiscuous packet 400 may be an Infiniband MAD, as described above, or may be another type of promiscuous packet on another type of network. The promiscuous packet 400 can reach its destination without using an established connection. The promiscuous packet 400 includes connection information with which each appliance can establish a connection to the other.

In block 706, a connection is established between the designated QPs using the connection information 404. Once the connection is established, the two appliances may perform RDMA reads and writes from each other's memory. In block 708, each appliance continues sending promiscuous packets 400 to each other. In one embodiment, the filers continue sending promiscuous packets to maintain a heartbeat (i.e., a signal that the connection is still active). The promiscuous packets may be sent to the special QPs, as described above.

Blocks 710-716 describe a process for determining whether the connection 614 is still active. Each filer continually performs this procedure to monitor the heartbeat of the other filer to which it is connected. In block 710, one filer determines whether the expected promiscuous packet 620 has been received from the other filer. The promiscuous packet 620 is issued by the other filer at a regular interval. If the promiscuous packet 620 is not received, there may be a problem with the connection 614. If the promiscuous packet 620 has been received, in block 712, the connection between the two appliances is active, and the process 700 returns to block 708, where more promiscuous packets 620 are issued. If the promiscuous packet 620 has not been received, in block 714, the filer attempts to perform an RDMA read from the other filer's memory over the established connection between two non-special QPs. If the RDMA read is successful, the connection is active, and the other appliance is most likely busy, and unable to dispatch the promiscuous packet 620. If the RDMA read is unsuccessful, in block 716, the HA manager 106 is notified that the connection is inactive. At that point, the HA manager 106 may take corrective action in block 716, including initiating failover procedures.

The techniques introduced above have been described in the context of a network attached storage (NAS) environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative rather than in a restrictive sense.

What is claimed is:

1. A method for monitoring a connection with a remote processing system comprising:
    establishing, by a computer, a connection with a remote processing system, that is mirrored by a mirror processing system, wherein the connection is established in response to receiving an initial promiscuous packet at a special queue pair and wherein the promiscuous packet is received before the connection is established;
    generating an initial determination of whether the connection with the remote processing system has failed by receiving a heartbeat packet from the remote processing system at a regular interval, wherein the heartbeat packet is a promiscuous packet received at the special queue pair and wherein the heartbeat packet is not sent through the connection with the remote processing system and wherein the initial determination causes generation of a final determination of whether the connection with the remote processing system has failed if the heartbeat packet is not received;
    generating the final determination, in response to the initial determination, by performing a remote direct memory access read on memory coupled to the remote processing system over the connection with the remote processing system, wherein the final determination is that the connection with the remote processing system has failed if the remote direct memory access read fails; and
    establishing, in response to the final determination that the connection with the remote processing system has failed, a new connection with the mirror processing system.

2. The method of claim 1, further comprising:
    notifying a connection manager if the connection is not active.

3. The method of claim 2, further comprising:
    establishing the connection using the connection manager.

4. The method of claim 2, further comprising:
    re-establishing the connection if the connection is not active.

5. The method of claim 2, further comprising:
    performing failover for the remote processing system if the connection is not active.

6. The method of claim 1, wherein establishing a connection comprises:
    receiving an instruction from a connection manager to issue a first promiscuous packet to the remote processing system;
    issuing the first promiscuous packet including a first connection information to establish the connection;
    receiving a second promiscuous packet from the remote processing system; and
    establishing the connection with a queue pair on the remote processing system, the queue pair is determined from a second connection information in the second promiscuous packet.

7. An apparatus for monitoring a network connection comprising:
    a processor; and
    a port coupled to the processor, the port to receive a promiscuous heartbeat packet at a special queue pair from a remote processing system at a regular interval, wherein the remote processing system is mirrored by a mirror processing system, wherein a connection with the remote processing system is established in response to receiving an initial promiscuous packet at the special queue pair and wherein the initial promiscuous packet is received before the connection is established;
    wherein if the promiscuous heartbeat packet is not received from the remote processing system when expected, the processor generates an initial determination of whether the connection with the remote processing system has failed, wherein the processor generates a final determination in response to the initial determination by performing a remote direct memory access read on memory coupled to the remote processing system over the established connection, and the final determination is that the established connection with the remote processing system has failed if the remote direct memory access read fails, and the processor establishes a new connection with the mirror processing system in response to determining that the connection with the remote processing system has failed.

8. The apparatus of claim 7, further comprising:
a non-volatile memory coupled to the port to mirror data from the remote processing system.

9. The apparatus of claim 7, wherein the processor notifies a connection manager if the established connection is inactive.

10. The apparatus of claim 9, wherein the connection manager instructs the processor to re-establish the connection if the connection is inactive.

11. The apparatus of claim 9, wherein the connection manager begins failover on the remote processing system if the connection is inactive.

12. The apparatus of claim 7, further comprising:
a second port coupled to a second switch;
wherein the port is coupled to a first switch.

13. The apparatus of claim 12, wherein the connection is a peer-to-peer connection.

14. A machine readable non-transitory storage medium having stored thereon executable program code which, when executed, causes a machine to perform a method for monitoring a connection between two processing systems, the method comprising:
establishing a connection with a remote processing system, that is mirrored by a mirror processing system, wherein the connection is established in response to receiving an initial promiscuous packet at a special queue pair and wherein the promiscuous packet is received before the connection is established;
generating an initial determination of whether the connection with the remote processing system has failed by receiving a heartbeat packet from the remote processing system at a regular interval, wherein the heartbeat packet is a promiscuous packet received at the special queue pair and wherein the heartbeat packet is not sent through the connection with the remote processing system and wherein the initial determination causes generation of a final determination of whether the connection with the remote processing system has failed if the heartbeat packet is not received;
generating the final determination, in response to the initial determination, by performing a remote direct memory access read on memory coupled to the remote processing system over the connection with the remote processing system, wherein the final determination is that the connection with the remote processing system has failed if the remote direct memory access read fails;
and
establishing, in response to the final determination that the connection with the remote processing system has failed, a new connection with the mirror processing system.

15. The non-transitory machine readable storage medium of claim 14, the method further comprising:
notifying a connection manager if the connection is not active.

16. The non-transitory machine readable storage medium of claim 15, the method further comprising:
re-establishing the connection using the connection manager.

17. The non-transitory machine readable storage medium of claim 14, wherein establishing a connection comprises:
receiving an instruction from a connection manager to issue a first promiscuous packet to the remote processing system;
issuing the first promiscuous packet including a first connection information to establish the connection;
receiving a second promiscuous packet from the remote processing system; and
establishing the connection with a queue pair on the remote processing system, the queue pair is determined from a second connection information in the second promiscuous packet.

* * * * *